United States Patent
Sauer et al.

(10) Patent No.: US 10,806,316 B2
(45) Date of Patent: Oct. 20, 2020

(54) DEVICE FOR A VACUUM CLEANER FILTER BAG WITH A HOLDING DEVICE AND A CLOSURE DEVICE

(71) Applicant: Eurofilters Holding N.V., Overpelt (BE)

(72) Inventors: Ralf Sauer, Overpelt (BE); Jan Schultink, Overpelt (BE)

(73) Assignee: EUROFILTERS HOLDING N.V., Overpelt (BE)

( * ) Notice: Subject to any disclaimer, the term of this patent is extended or adjusted under 35 U.S.C. 154(b) by 187 days.

(21) Appl. No.: 16/084,907

(22) PCT Filed: Mar. 16, 2017

(86) PCT No.: PCT/EP2017/056211
§ 371 (c)(1),
(2) Date: Sep. 13, 2018

(87) PCT Pub. No.: WO2017/158074
PCT Pub. Date: Sep. 21, 2017

(65) Prior Publication Data
US 2019/0082914 A1 Mar. 21, 2019

(30) Foreign Application Priority Data
Mar. 17, 2016 (EP) .................................. 16160966

(51) Int. Cl.
*B01D 29/00* (2006.01)
*B29C 65/08* (2006.01)
(Continued)

(52) U.S. Cl.
CPC ........ *A47L 9/1454* (2013.01); *B01D 29/0029* (2013.01); *B29C 51/002* (2013.01);
(Continued)

(58) Field of Classification Search
CPC ....... B29C 65/08; A47L 9/1454; B01D 29/00; B01D 29/0029
(Continued)

(56) References Cited

U.S. PATENT DOCUMENTS

| | | |
|---|---|---|
| 2007/0175817 A1 | 8/2007 | Goldman |
| 2009/0223190 A1 | 9/2009 | Nauta et al. |
| 2011/0030557 A1 | 2/2011 | Brownstein et al. |

FOREIGN PATENT DOCUMENTS

| | | |
|---|---|---|
| CN | 1327374 A | 12/2001 |
| CN | 101747596 A | 6/2010 |

(Continued)

OTHER PUBLICATIONS

East Bavarian Technical College: construction course in plastics technology East Bavarian Technical University Amberg-Weiden; Study content for the course of plastics technology; downloaded from the internet on May 23, 2019 at https://www.oth-aw.de/studiengaende-und-bildungsangbote/studienangebote/bachelor-studiengaenge/kunstofftechnik/aufbau/; 10 pages including English translation.

(Continued)

*Primary Examiner* — Robert A Hopkins
(74) *Attorney, Agent, or Firm* — Brinks Gilson & Lione

(57) ABSTRACT

The invention relates to a device for a vacuum cleaner filter bag comprising a holding device with a passage opening and a closure device for closing the passage opening of the holding device, wherein the closure device comprises a closure flap and an elastic element made of a cross-linked silicone elastomer, and the elastic element is pretensioned in a state in which the closure flap closes the passage opening of the holding device.

13 Claims, 2 Drawing Sheets

(51) Int. Cl.
*A47L 9/14* (2006.01)
*B29C 65/00* (2006.01)
*B29C 51/00* (2006.01)
*B29L 31/00* (2006.01)
*B29K 21/00* (2006.01)
*B29K 23/00* (2006.01)

(52) U.S. Cl.
CPC .......... *B29C 65/08* (2013.01); *B29C 66/1122* (2013.01); *B29C 66/232* (2013.01); *B29C 66/30325* (2013.01); *B29C 66/47* (2013.01); *B29C 66/472* (2013.01); *B29C 66/532* (2013.01); *B29C 66/5326* (2013.01); *B29C 66/61* (2013.01); *B29C 66/71* (2013.01); *B29C 66/7294* (2013.01); *B29C 66/73755* (2013.01); *B29K 2021/003* (2013.01); *B29K 2023/06* (2013.01); *B29K 2023/12* (2013.01); *B29L 2031/7128* (2013.01); *B29L 2031/7406* (2013.01)

(58) Field of Classification Search
USPC .................................................. 55/361, 367
See application file for complete search history.

(56) References Cited

FOREIGN PATENT DOCUMENTS

| | | |
|---|---|---|
| CN | 103009626 A | 4/2013 |
| DE | 1 628 582 | 2/1968 |
| DE | 90 16 939 U1 | 5/1991 |
| DE | 44 15 350 A1 | 11/1995 |
| DE | 296 15 163 U1 | 1/1997 |
| DE | 2001 0049 U1 | 10/2000 |
| DE | 199 19 809 A1 | 11/2000 |
| DE | 199 48 909 A1 | 4/2001 |
| DE | 102 03 460 A1 | 8/2002 |
| DE | 10221694 A1 | 12/2003 |
| DE | 20 2006 020 047 U1 | 10/2007 |
| DE | 10 2006 037 456 A1 | 2/2008 |
| DE | 10 2006 055 890 A1 | 5/2008 |
| DE | 20 2008 003 248 U1 | 6/2008 |
| DE | 20 2008 005 050 U1 | 7/2008 |
| DE | 20 2008 004 733 U1 | 11/2008 |
| DE | 10 2008 046 200 A1 | 4/2009 |
| DE | 10 2007 062 028 A1 | 6/2009 |
| DE | 20 2008 006 904 U1 | 11/2009 |
| DE | 10 2008 041 227 A1 | 2/2010 |
| DE | 20 2008 018 054 U1 | 6/2011 |
| DE | 10 2010 060 175 A1 | 3/2012 |
| DE | 10 2011 008 117 A1 | 4/2012 |
| DE | 10 2010 060 353 A1 | 5/2012 |
| DE | 10 2011 105 384 A1 | 12/2012 |
| DE | 20 2013 001 096 U1 | 4/2013 |
| DE | 20 2011 052 208 U1 | 5/2013 |
| DE | 20 2013 100 862 U1 | 5/2013 |
| DE | 10 2012 012 999 A1 | 7/2013 |
| DE | 20 2013 103 508 U1 | 10/2013 |
| DE | 10 2014 109 596 A1 | 2/2015 |
| DE | 20 2015 101 218 U1 | 5/2015 |
| DE | 20 2014 100 563 U1 | 6/2015 |
| EP | 0 758 209 A1 | 11/1995 |
| EP | 0 960 645 A2 | 12/1999 |
| EP | 1 198 280 A1 | 1/2001 |
| EP | 1 137 360 A1 | 4/2001 |
| EP | 1 254 693 A2 | 11/2002 |
| EP | 1258277 A1 | 11/2002 |
| EP | 1 480 545 A1 | 9/2003 |
| EP | 1 795 247 A1 | 6/2007 |
| EP | 1 795 427 A1 | 6/2007 |
| EP | 1917895 B1 | 5/2008 |
| EP | 2004303 B1 | 12/2008 |
| EP | 2 011 556 A1 | 1/2009 |
| EP | 2 044 874 A2 | 4/2009 |
| EP | 2 123 206 A1 | 11/2009 |
| EP | 2 263 508 A1 | 12/2010 |
| EP | 2 442 703 A1 | 12/2010 |
| EP | 2 301 404 A2 | 3/2011 |
| EP | 2 433 695 A1 | 3/2012 |
| EP | 3 219 373 A1 | 9/2017 |
| EP | 3 219 374 A1 | 9/2017 |
| EP | 3 219 375 A1 | 9/2017 |
| FR | 2 721 188 A1 | 12/1995 |
| WO | WO 01/003802 A1 | 1/2001 |
| WO | WO 03/073903 A1 | 9/2003 |
| WO | WO 07/121979 A1 | 11/2007 |
| WO | WO 11/047764 A1 | 4/2011 |
| WO | WO 11/057641 A1 | 5/2011 |
| WO | WO 13/106392 A2 | 7/2013 |
| WO | WO 2014/074398 A2 | 5/2014 |

OTHER PUBLICATIONS

European Standard No. DIN EN 15347: Plastics, Recycled Plastics, Characterisation of Plastics Wastes, English Version; ICS 13.030.50; 83.080.01; Feb. 2008; 12 pages.

Shen, Li et al.; "Open-loop recycling: A LCA case study of PET bottle-to-fibre recycling"; Resources, Conservation and Recycling, vol. 55; Nov. 1, 2010; pp. 34-52.

International Search Report dated Jun. 29, 2017 for International Application No. PCT/EP2017/056211.

Lueger; Encyclopedia of the entire technology: Staple Fiber 600 (Neuschappe); downloaded from the Internet on Aug. 29, 2019 at http://www.zeno.orq/Lueger-1904/A/Stapelfaser; 1920; including English translation.

Office Action dated May, 22, 2020, for Chinese International Application No. 201780025117.7 (19 pgs.) (English Translation attached).

DEVICE FOR A VACUUM CLEANER FILTER BAG WITH A HOLDING DEVICE AND A CLOSURE DEVICE

This application claims the benefit under 35 U.S.C. § 371 of International Application No. PCT/EP2017/056211, filed Mar. 16, 2017, which claims the priority of European Patent Application No. 16160966.4, filed Mar. 17, 2016, which are incorporated by reference herein in their entirety.

FIELD OF THE INVENTION

The invention relates to a device with a holding device and a closure device for a vacuum cleaner filter bag.

BACKGROUND OF THE INVENTION

Vacuum cleaner filter bags are often used in vacuum cleaners to filter the intake air. These vacuum cleaner filter bags comprise a bag wall made of a filter material, for example, non-woven fabric, which filters out the dust and dirt particles contained in the intake air, and a holding plate fastened to the bag wall for positioning the vacuum cleaner filter bag in the vacuum cleaner. On the side of the device, the holding plate in the filter bag receiving space of the vacuum cleaner is usually associated with a receptacle with which the holding plate can be made to engage, whereby in turn the vacuum cleaner filter bag is positioned in the vacuum cleaner. The air to be filtered is typically passed via a connection port through a passage opening in the holding plate and in the bag wall into the interior of the filter bag. The openings in these holding plates are often closable by way of a closure device, for example, in the form of a closure flap. During the vacuuming operation, the closure device is in an open position in which the passage opening of the holding plate is open. For example, the closure device is opened when the vacuum cleaner is switched on, i.e., due to the resulting air flow. Upon termination of the vacuuming operation, the closure device closes.

For instance, manually operable closure devices (DE 20 2013 001 096) and automatic closure devices (DE 10 2006 055 890, EP 0 758 209) as well as foldable closure members (DE 10 2011 105 384) and membrane closure devices (DE 20 2014 100 563 and FR 2 721 188) are known. A closure device with a holding member is known from DE 10 2014 109 596 on which a closure element is mounted in the form of a pivotable closure flap. A holder with a two-part configuration of a holding device comprising a base plate and a closure device is known from DE 20 2011 052 208 as well as from DE 20 2013 103 508 and DE 10 2010 060 353.

Prior art closure devices can be made to assume a closed state by way of leaf springs (EP 2 123 206 and DE 296 15 163), cambered leaf springs (EP 1 137 360), coil springs (DE 10 2012 012 999), wire springs (DE 20 2013 100 862, DE 10 2008 046 200, DE 10 2006 037 456), cord-like elastomer elements (DE 20 2008 004 733), cuboid elastomer elements (EP 1 480 545 B1) or latex rubber (DE 1 628 582). A spring element can be arranged in the interior of the vacuum cleaner filter bag (DE 10 2011 008 117 and DE 20 2015 101 218). According to the teaching of EP 1 480 545, the spring element is in the closed state of the closure flap outside of the bag and in the operating state in the interior of the same.

Furthermore, it is known in prior art to provide sea elements for a seal between the connection port and the holding plate. DE 102 03 460 describes how a part of the vacuum cleaner filter bag itself can be used as a seal. Elastomer seals in the interior of the vacuum cleaner filter bag are described in DE 10 2010 060 353 and DE 10 2007 062 028. A sealing ring attached to the holding plate is described in DE 10 2008 041 227, and a sealing membrane between the vacuum cleaner filter bag and the holding plate is described in EP 2 044 874.

The closure devices known from prior art typically comprise springs, by use of which passage openings in the holding plates or the closure devices, respectively, can be closed by way of flaps. The adjustment and installation of such springs is very complex and error-prone.

DESCRIPTION OF THE INVENTION

In view of the prior art, there is a need for an inexpensive and reliable device that is easy to manufacture with a holding device and a closure device for a vacuum cleaner filter bag. For this purpose, the invention provides a device for a vacuum cleaner filter bag according to claim 1. This device for a vacuum cleaner filter bag comprises a holding device with a passage opening and a closure device for opening and closing the passage opening of the holding device. The closure device comprises a closure flap and an elastic element made of a crosslinked silicone elastomer. The elastic element is pretensioned in a state in which the closure flap closes the passage opening of the holding device.

The vacuum cleaner filter bag can be positioned in a filter bag receiving space of a vacuum cleaner with the aid of the holding device, in that the holding device is made to engage with a corresponding receptacle of the filter bag receiving space. The holding device can be formed in particular as a holding plate. For example, the holding device can be formed separately from the closure device.

The closure device according to the invention comprises an elastic element made of a crosslinked silicone elastomer. The thickness of the elastic element can be more than 0.5 mm, in particular more than 1 or 2 mm, in order to ensure sufficient stability and/or restoring force. This elastic element made of the crosslinked silicone elastomer is pretensioned in a state where the closure flap closes the passage opening. The elastic element and therefore provides a restoring force and enables a flapping motion of the closure flap. Opening of the closure flap takes place against the elastic pretension. Therefore, no additional spring is required like in the prior art, thereby significantly facilitating the manufacture of the closure device.

The closure device can comprise a base plate or a base member, where the base plate or the base member has a further passage opening in alignment with the passage opening of the holding device. The closure flap of the closure device is then also used for closing the further passage opening, in addition to closing the passage opening of the holding device. The further passage opening and the closure flap (as well as the passage opening of the holding device) can be formed to be round, in particular circular. The holding device can be made of polypropylene, polyethylene, polyvinyl chloride, polycarbonate, and/or polyethylene terephthalate, or comprise at least one of these materials. The closure flap and the base member can be connected to one another exclusively by way of the elastic element with the crosslinked silicone elastomer. The elastic element can be fixedly connected to the closure flap and the base member and can provide a hinge between the closure flap and the base member. The elastic element can be formed to be, for example, strip-shaped.

According to a further embodiment, the closure flap can be connected to the holding device exclusively by way of the elastic element made of the crosslinked silicone elastomer.

In contrast to prior art, no respective additional spring element or hinge (for example, a film hinge) is required. Both a hinge function as well as a restoring force can be provided solely by the elastic element made of the cross-linked silicone elastomer.

The holding device can be made by thermo-forming, for example by thermo-forming and punching out from a film. Alternatively, the holding plate is produced as a simple injection-molded plate. The holding device can be configured in the shape of a holding plate or comprise such. The thermo-forming process is significantly more inexpensive than the injection-molding process used in prior art for the manufacture of holding plates. The holding device must be individually adapted for respective filter bag receiving spaces or the receptacles therein, with which the holding device is made to engage. In contrast to prior art, a holding device and therefore a vacuum cleaner filter bag with the claimed device can be produced economically by the thermo-forming of the holding device provide by the invention, even in relatively small quantities. In particular, thermo-formed holding devices can also be relatively easily and reliably connected to nonwoven (fabric) materials from which vacuum cleaner filter bags can be produced, for example, by ultrasonic welding. The closure devices, however, do not have to be individually matched to filter bag receiving spaces and can interact with various individually matched holding devices and are therefore generally produced in large numbers, so that even a relatively expensive injection-molding process for producing the closure device is economically acceptable. It is to be noted that injection-molded closure devices are very reliable in terms of the closing properties. It is advantageous in any case that the complex closure device can be used in a universal manner.

According to one embodiment, the entire closure device is produced (integrally) from the crosslinked silicone elastomer, where the closure device can comprise a base member (for example, for attachment to a vacuum cleaner filter bag or under the holding device). The base member and the closure flap can be connected to one another by way of the elastic element made of the cross-linked silicone elastomer in such a way that they form an angle, for example, an angle between 30 and 60 degrees, without any pretension of the elastic element (in the non-assembled state of the closure device). The closure flap and the elastic element (and optionally the base member) can be produced together in a single injection-molding process or in an extrusion process. The closure device can also be configured to comprise a base member and an elastic element made of a cross-linked silicone elastomer and a closure flap made of different material, such as thermoplastic material, or such as to comprise a closure flap and an elastic element made of a cross-linked silicone elastomer and a base member made of different material, for example, thermoplastic material.

According to one alternative embodiment, not the entire closure device is made of the crosslinked silicone elastomer. It comprises the elastic element made of the cross-linked silicone elastomer; furthermore, it comprises a closure flap and a base member made of different material, for example, made of thermoplastic material. Again, the closure flap can be connected to the base member, which can likewise be made of the cross-linked silicone elastomer, of the closure device by way of the elastic element made of the cross-linked silicone elastomer, for example, at an angle, for example, at an angle between 30 and 60 degrees, without any pretension of the elastic element (in the non-assembled state of the closure device). The elastic element can there be injection-molded onto the base member and/or the closure flap.

In all embodiments, the elastic element made of the crosslinked silicone elastomer can have a kink in the non-pretensioned state. The pretension mentioned can be imparted by this kink. In the non-pretensioned state, the elastic element can have two sections forming an angle.

The closure device can be disposed below the holding device (on a side facing a bag wall of a vacuum cleaner bag to which the holding device is attached; during the operation of a vacuum cleaner using a vacuum cleaner bag with the holding device, "below" is in airflow direction further away than "above"). Alternatively, the closure device can be arranged above the holding device (on a side facing away from a bag wall of a vacuum cleaner bag to which the holding device is attached). The holding device can comprise a seal element which is provided at least in part along the circumference of the passage opening of the holding device. In general, a seal element, for example a sealing lip, can be comprised for sealing a connection port of a vacuum cleaner with the further passage opening of the closure device or the passage opening of the holding device, respectively. The seal element can be made of or comprise a thermoplastic elastomer. Alternatively, the seal element can be made of or comprise a cross-linked silicone elastomer.

Further provided is a vacuum cleaner filter bag with a device according to one of the examples described above. The closure device can there be provided in the interior of the vacuum cleaner filter bag or between the vacuum cleaner filter bag and the holding device. The closure device is directly connected to a bag wall of the vacuum cleaner filter bag and is mounted such that the elastic element is pretensioned and closes the passage opening of the holding device. When the vacuum cleaner filter bag with the device is to be replaced due to the degree of filling, a connection port of the vacuum cleaner is removed from the passage opening and the closure device closes the passage opening by way of the elastic element made of the crosslinked silicone elastomer.

The vacuum cleaner filter bag can be configured, in particular, in the shape of a flat bag or a block bottom bag. The vacuum cleaner filter bag can comprise a bag wall having one or more layers of nonwoven and/or nonwoven fabric.

According to one embodiment, the vacuum cleaner filter bag comprises a seal element attached thereto for sealing a connecting port of a vacuum cleaner with the passage opening of the holding device or the further passage opening of the closure device.

The attachment of the closure device of the device according to the invention in the above-described embodiments to the bag wall of a vacuum cleaner bag or the holding device can be done using ultrasonic welding. In order to facilitate the attachment, undercuts can be provided in the closure device into which material of the vacuum cleaner bag (nonwoven fabric material) or of the holding device flows which was melted by the ultra-sound welding. The undercuts are groove-shaped depressions tapering to the surface (of the crosslinked silicone elastomer). They can be formed in the course of extruding the closure device. In particular, the undercuts can be provided in the above-mentioned base member of the closure device made of the crosslinked silicone elastomer and/or the elastic element thereof.

Further features and advantages of the invention will become apparent from the detailed but not restricting description of embodiments which are illustrated using the accompanying drawings. It is further understood that some or all features described hereafter can also be combined with each other in a different way.

Figure 1A:
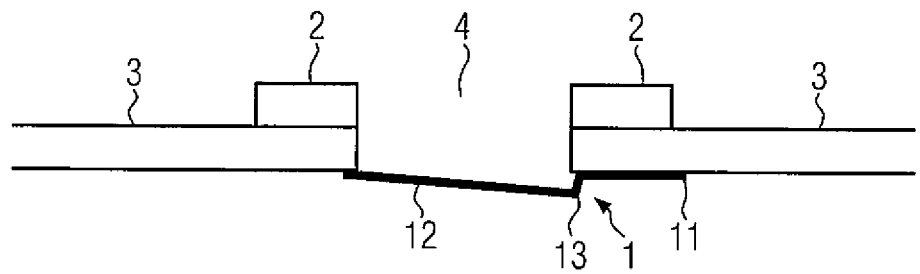
FIG. 1a shows a device with a holding device attached on a vacuum cleaner filter bag and a closure device attached in the vacuum cleaner filter bag.
Figure 1B:
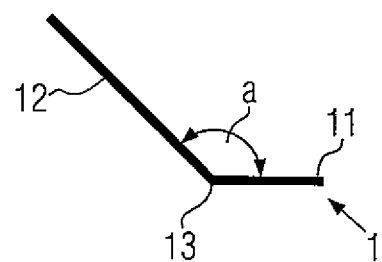
FIG. 1b shows the closure device shown in FIG. 1a in a non-assembled state.

FIG. 1a shows a device according to the invention with a closure device 1 and a holding device (holding plate) 2. Closure device 1 is attached in the interior of a vacuum cleaner filter bag on the inner side of a bag wall 3 of the vacuum cleaner filter bag. Holding device 2 is attached on the exterior of the vacuum cleaner filter bag on the outer side of bag wall 3 and comprises a passage opening 4. FIG. 1b shows closure device 1 of FIG. 1a in a non-assembled state. Closure device 1 comprises a base member 11, a closure flap 12 and an elastic element 13 made of a cross-linked silicone elastomer by way of which closure flap 12 is hinged to base member 11 at angle a (in the non-assembled state).

Closure device 1 is mounted such that closure flap 12 closes passage opening 4 and a respective opening in bag wall 3 due to the tension of elastic element 13 made of the crosslinked silicone elastomer. By inserting a connecting port of a vacuum cleaner through passage opening 4, closure flap 12 of closure device 1 can be opened, i.e. be moved in the direction towards the interior of the vacuum cleaner filter bag. If the vacuum cleaner filter bag is to be replaced due to the degree of filling, the connection port of the vacuum cleaner is removed from the passage opening, and closure flap 12 closes due to the action of elastic element 13 of closure device 1, so that no dust can escape from the filled vacuum cleaner filter bag when removing the vacuum cleaner filter bag from a filter bag receiving space of the vacuum cleaner.

Figure 2:
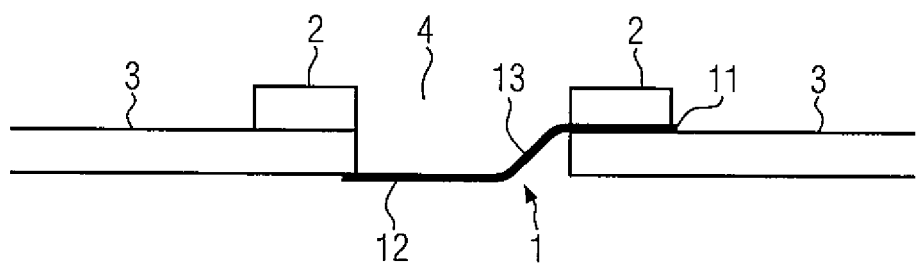
FIG. 2 shows a device with a holding device attached on a vacuum cleaner filter bag and a closure device attached between the holding device and a bag wall of the vacuum cleaner filter bag.

While closure device 1 is arranged in the interior of the vacuum cleaner filter bag in the embodiment shown in FIG. 1a, the former can be arranged in an alternative embodiment at least in part between holding device 2 and bag wall 3 as shown in FIG. 2.

Figure 3:
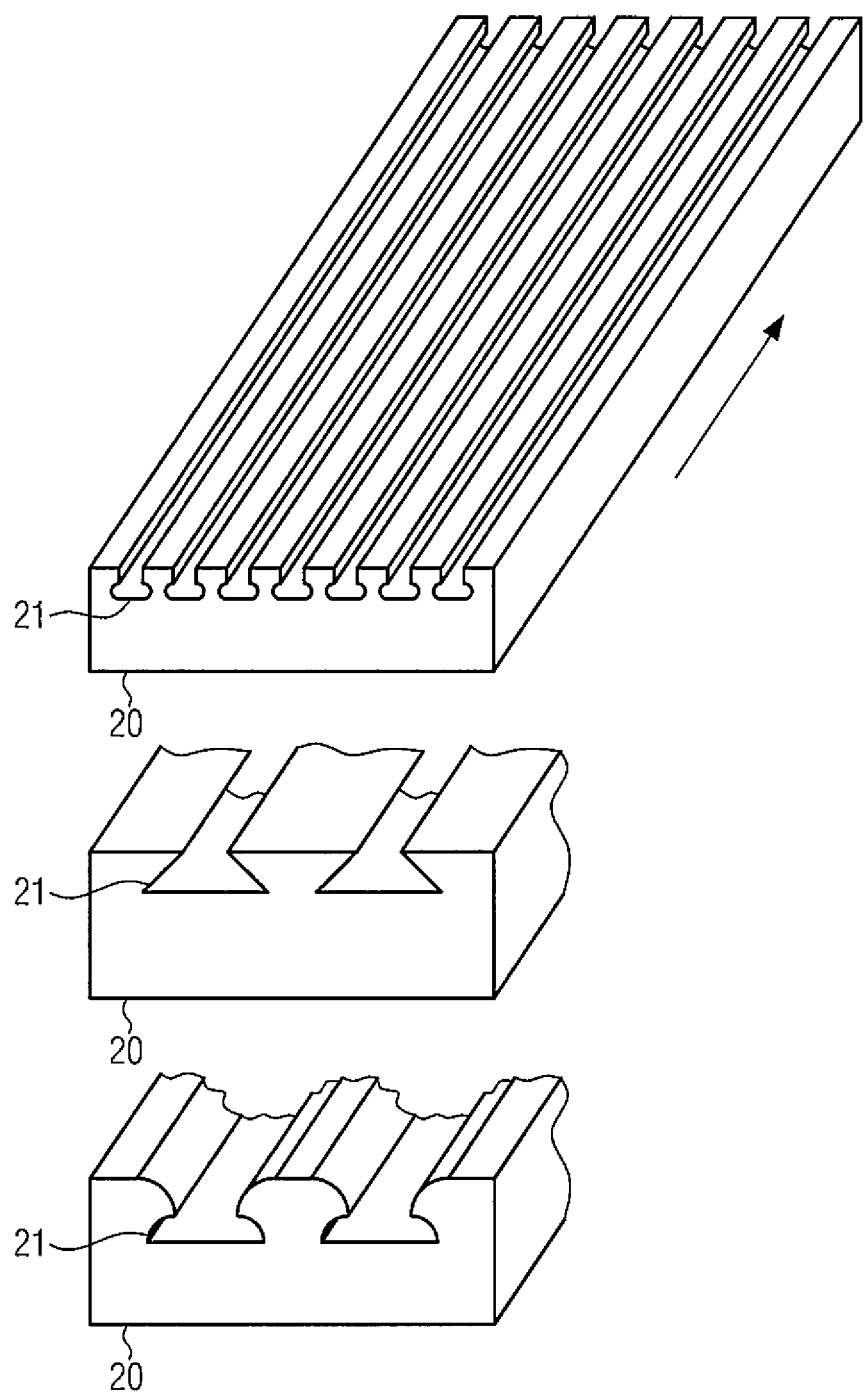
FIG. 3 shows examples of a component of a closure device with undercuts.

The attachment of closure device 1 in the interior of the vacuum cleaner filter bag or on holding device 2 can be effected by ultrasonic welding. For this purpose, it can be advantageous to provide the crosslinked silicone elastomer with undercuts, as shown in FIG. 3. FIG. 3 shows three examples of an extruded component 20 of a closure device, for example, closure device 1 of FIGS. 1a, 1b and 2, made of a cross-linked silicone elastomer with undercuts 22 having different geometrical shapes. These undercuts 21 can be formed in the course of the extrusion process (the arrow in FIG. 3 indicates the direction of extrusion). When component 20 of the closure device is attached to a bag wall of a vacuum cleaner filter bag or to a holding device by way of ultrasonic welding, material of the bag wall or of the holding device melts and can flow into undercuts 21 for reliable attachment. Component 20 can in particular be part of elastic element 13, as illustrated for example in FIG. 1a, 1b, or 2.

It is understood that the features in the embodiments described above are not restricted to these specific combinations and are also possible in any other random combination. Furthermore, it is understood that the vacuum cleaner filter bag shown in the figures and the holding device as well as the closure device are not reproduced to scale for reasons of illustration. In addition, the geometries or shapes of the elements shown are not restricted to the examples shown.

The invention claimed is:

1. A device for a vacuum cleaner filter bag, comprising a holding device with a passage opening; and
a closure device for closing said passage opening of said holding device;
wherein said closure device comprises a closure flap and an elastic element made of a crosslinked silicone elastomer and wherein said elastic element is pretensioned in a state in which said closure flap closes said passage opening of said holding device.

2. The device according to claim 1, wherein said closure device is made of said crosslinked silicone elastomer.

3. The device according to claim 1, wherein said closure flap is made of thermoplastic material.

4. The device according to claim 2, wherein said closure device is integrally formed by said closure flap, said elastic element made of said crosslinked silicone elastomer and a base member, wherein said closure flap is hinged to said base member by way of said elastic element made of said crosslinked silicone elastomer.

5. The device according to claim 1, wherein said closure device is formed by said closure flap, said elastic element made of said cross-linked silicone elastomer and a base member and said closure flap and said base member are connected to each other exclusively by way of said elastic element.

6. The device according to claim 1, wherein said closure flap is connected to said holding device exclusively by way of said elastic element made of said crosslinked silicone elastomer.

7. The device according to claim 1, wherein said holding device is an injection-molded or a thermo-formed holding device.

8. The device according to claim 1, wherein said closure device is arranged below or above said holding device.

9. The device according to claim 1, wherein said holding device comprises a seal element, for sealing a connection port of a vacuum cleaner with said passage opening of said holding device, and which is provided at least in part along the circumference of said passage opening.

10. The device according to claim 1, wherein said holding device consists of or comprises polypropylene, polyethylene, polyvinyl chloride, polycarbonate, or polyethylene terephthalate.

11. The device according to claim 1, wherein said closure device comprises undercuts.

12. A vacuum cleaner filter bag with a device according to claim 1.

13. The vacuum cleaner filter bag according to claim 12, wherein said closure device is provided in the interior of said vacuum cleaner filter bag or between a bag wall of said vacuum cleaner filter bag and said holding device.

* * * * *